US008438346B2

(12) United States Patent
Gold (10) Patent No.: US 8,438,346 B2
(45) Date of Patent: May 7, 2013

(54) SYNCHRONIZATION OF A VIRTUAL STORAGE SYSTEM AND AN ACTUAL STORAGE SYSTEM (75) Inventor: Stephen Gold, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2072 days.

(21) Appl. No.: 11/412,485

(22) Filed: Apr. 27, 2006

(65) Prior Publication Data
US 2007/0255920 A1    Nov. 1, 2007

(51) Int. Cl.
G06F 12/00    (2006.01)
G06F 13/00    (2006.01)
G06F 13/28    (2006.01)

(52) U.S. Cl.
USPC ............ 711/162; 711/111; 711/114; 711/161

(58) Field of Classification Search ........................ None
See application file for complete search history.

(56) References Cited

U.S. PATENT DOCUMENTS

| 6,789,161 | B1 | 9/2004 | Blendermann et al. |
| 2002/0035664 | A1* | 3/2002 | Yates et al. ..................... 711/111 |
| 2003/0014568 | A1* | 1/2003 | Kishi et al. ......................... 710/4 |
| 2004/0044842 | A1 | 3/2004 | Trimmer et al. |
| 2004/0044863 | A1* | 3/2004 | Trimmer et al. .............. 711/161 |
| 2004/0078639 | A1 | 4/2004 | Anna et al. |
| 2004/0153739 | A1 | 8/2004 | Trimmer et al. |
| 2004/0181628 | A1* | 9/2004 | Trimmer et al. .............. 711/111 |
| 2005/0033911 | A1 | 2/2005 | Kitamura et al. |
| 2005/0108470 | A1 | 5/2005 | Gold et al. |
| 2006/0047905 | A1 | 3/2006 | Matze et al. |

* cited by examiner

Primary Examiner — Michael Alsip (57) ABSTRACT

A virtual storage system includes a storage subsystem having virtual storage devices to emulate physical storage devices of an actual storage system. The virtual storage system has a controller to detect a status change of a particular physical storage device in the actual storage system. The status change includes at least one of loading of the particular physical storage device and ejecting of the particular physical storage device. In response to detecting the status change of the particular physical storage device, the controller performs synchronization between the virtual storage system and the actual storage system by updating a state of a corresponding virtual storage device in the virtual storage system.

19 Claims, 4 Drawing Sheets

SYNCHRONIZATION OF A VIRTUAL STORAGE SYSTEM AND AN ACTUAL STORAGE SYSTEM

BACKGROUND

A virtual tape storage system (also referred to as a virtual tape library) is used to emulate an actual tape storage system. Many virtual tape storage systems are implemented as disk-based systems that contain virtual tape devices (implemented with disk-based devices) for emulating physical tape devices of the actual tape storage system.

A tape storage system is typically used for performing backup of data contained in various systems, such as application servers. However, tape storage systems are typically relatively slow, such that if the amount of data that has to be backed up is very large, then performing backups to tape storage systems becomes impractical. The use of virtual tape storage systems, containing disk-based devices, allows backup operations to complete in shorter amounts of time, since disk-based devices have higher access speeds than tape-based devices.

However, use of virtual tape storage systems is associated with various issues. For example, physical tape devices in the actual tape storage system and virtual storage devices in the virtual tape storage system can become un-synchronized such that when a backup software application attempts to restore from a particular physical tape device, the backup application may get confused if the physical tape device does not match what the backup application expects to see.

BRIEF DESCRIPTION OF THE DRAWINGS

Some embodiments of the invention are described with respect to the following figures.

DETAILED DESCRIPTION

Figure 1:
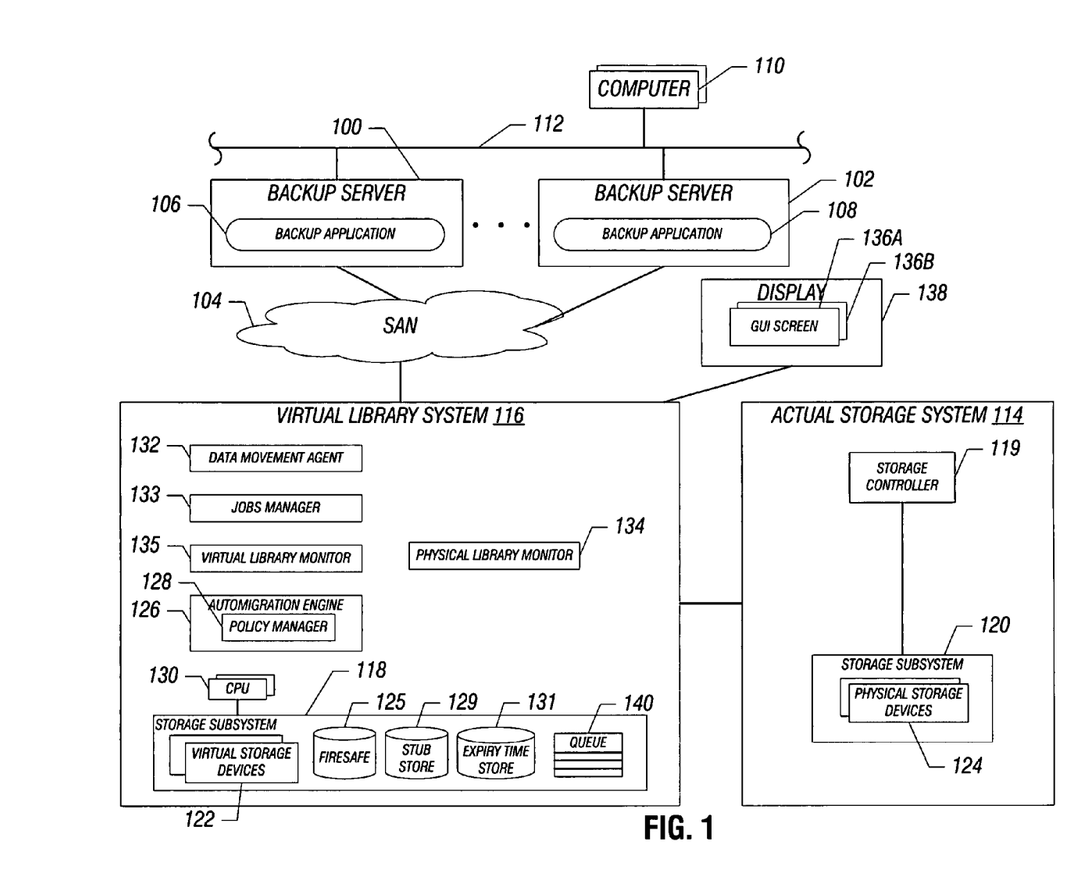
FIG. 1 illustrates an example arrangement of backup servers, a virtual library system, and an actual storage system, according to an embodiment.

FIG. 1 illustrates an example arrangement that includes backup servers 100, 102 coupled to a storage area network (SAN) 104. Each backup server 100, 102 includes a corresponding backup application 106, 108. The backup applications 106, 108 control backup of data from computers 110 on a network 112 (e.g., a local area network, wide area network, the Internet, and so forth). During backup operations, data from the computers 110 (which can be application servers, web servers, and so forth) are copied by the backup servers 100, 102 over the SAN 104 to a library system (virtual library system 116 as depicted in FIG. 1). Data can also be restored from the virtual library system 116 back to the computers 110.

Traditionally, backups are performed to an actual tape storage system (such as actual storage system 114). However, since an actual tape storage system may have slow access speeds, backup operations may take relatively long periods of time. To address the relatively slow speeds of actual tape storage systems, the virtual library system 116 is provided between the storage area network 104 and the actual storage system 114, where the virtual library system contains a storage subsystem 118 having storage devices with faster access speeds than physical storage devices 124 (e.g., tape cartridges) of a storage subsystem 120 in the actual storage system 114.

The storage subsystem 118 in the virtual library system 116 provides virtual storage devices 122 for emulating physical storage devices 124 in the storage subsystem 120 of the actual storage system. In one example, the storage subsystem 118 includes disk-based storage devices, while the storage subsystem 120 includes tape-based physical storage devices 124. In this example, the disk-based storage devices of the storage subsystem 118 provide the virtual storage devices 122 for emulating the physical storage devices 124. In this manner, backups performed to the virtual library system 116 from the backup servers 100, 102 can be accomplished much more quickly than backups performed directly to the actual storage system 114.

In other implementations, the actual storage system 114 can include other types of storage media. For example, instead of a tape-based storage subsystem, the actual storage system 114 can include a disk-based storage subsystem that has disk-based devices for storing backup data. In this alternative implementation, the virtual library system 116 can be designed with a storage subsystem 118 made of faster storage devices (such as faster disk-based storage devices, semiconductor-based storage devices, and so forth). More generally, the virtual library system 116 is provided to improve data read and write speeds when compared to the actual storage system 114 during backup or restore operations.

There are various example use cases of the virtual library system 116. In one implementation, multiple virtual libraries can be provided on the virtual library system 116, with each virtual library mapped to a different backup server 100, 102. This is a non-shared arrangement, in which a dedicated non-shared virtual library is allocated for each backup server. By using automigration (described further below), a single actual storage system 114 can be shared among the multiple virtual libraries provided by the virtual library system 116 (so that multiple actual storage systems 114 do not have to be provided). Alternatively, multiple actual storage systems 114 can be provided for mapping to the virtual libraries of the virtual library system 116.

In another use case, multiple backup servers 100, 102 are mapped to a single virtual library provided by the virtual library system 116. Automigration can be used to copy data from the virtual library system 116 to one or more actual storage systems 114. Other use cases are also possible in other example implementations.

In some scenarios, a backup application (106, 108) is able to control the copying of data from virtual storage devices 122 in the storage subsystem 118 of the virtual library system 116 to corresponding physical storage devices 124 of the storage subsystem 120 in the actual storage system 114. The copying of the content of virtual storage devices (e.g., virtual tape cartridges) to physical storage devices (e.g., physical tape cartridges) allows for offsite storage or longer term retention of data stored on the physical storage devices 124.

Alternatively, an automigration technique can be used to copy data from the virtual storage devices to the actual storage devices. Automigration refers to the virtual library system 116 performing background copying of data on virtual storage devices 122 to corresponding physical storage devices. This background copying (controlled by an automigration engine 126 in the virtual library system 116) is performed transparently to the backup application (106, 108) so that the backup application (106, 108) has no awareness of the resulting physical storage device(s) 124. Synchronization may be lost if an automigration technique of copying data from virtual storage devices 122 to physical storage devices 124 is used. Synchronization of virtual storage devices and physical storage devices means that various characteristics of the virtual storage devices and physical storage devices are matched (or remain the same). Example characteristics of the physical storage devices include bar codes (or other identifiers), media type, media size, content stored on the media of the physical storage devices, and other characteristics. To maintain synchronization between the physical and virtual storage devices, the characteristics of the virtual storage devices are maintained the same as the characteristics of the physical storage devices. In this context, characteristics refer to both actual data (data stored on the storage device) and metadata (data about the storage device, such as its bar code, media type, and media size). Synchronization also means that a backup application (106, 108) should not see the same storage device in two different storage libraries.

Synchronization lost between the virtual storage devices 122 and the physical storage devices 124 may cause the backup application to be confused when attempting to restore data directly from a physical storage device if the physical storage device does not match what the backup application expects to see.

To ensure that synchronization is maintained between virtual storage devices 122 and physical storage devices 124 when automigration is used, a policy manager 128 according to some embodiments (that is part of the automigration engine 126 in the depicted embodiment) is provided in the virtual library system 116. In alternative embodiments, the policy manager 128 can be separate from the automigration engine 126. To achieve synchronization, the policy manager 128 (in association with other modules described further below) monitors both the virtual library system 116 and actual storage system 114 to detect various status changes to the virtual library system 116 and/or actual storage system 114, where such status changes include load and eject changes of physical or virtual storage devices, and data state changes in the virtual storage devices.

The automigration engine 126, using its policy manager 128, synchronizes the physical and virtual media. The automigration engine 126 and policy manager 128 (along with other software modules described below) in the virtual library system 116 are executable on one or more central processing units (CPUs) 130 of the virtual library system 116.

Figure 2:
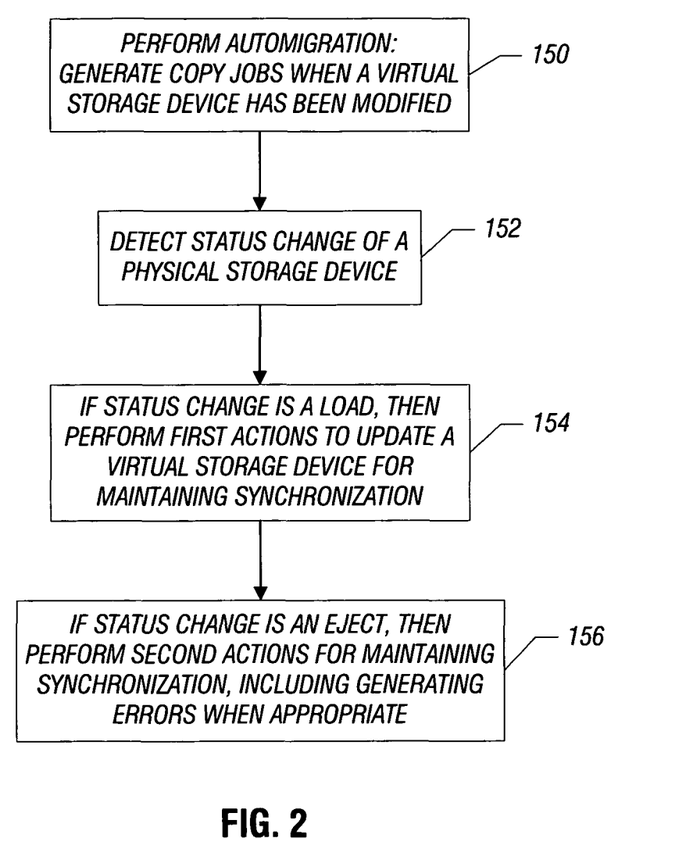
FIG. 2 is a flow diagram of a general process of synchronizing virtual storage devices and physical storage devices, according to an embodiment.

As depicted in FIG. 2, a data state change on a virtual storage device 122 causes a copy job to be scheduled (at 150) to copy data from the modified virtual storage device 122 to the corresponding physical storage device 124. This copy job is part of automigration. Thus, for example, when a backup application (106, 108) completes a backup to a particular virtual storage device (which causes the content of the particular virtual storage device to change), then the automigration engine 126 causes a copy job to be scheduled to copy data on the particular virtual storage device to the corresponding physical storage device.

A load/eject status change (load or eject of a storage device) can also be detected (at 152) to trigger certain actions by the policy manager 128. If a physical storage device 124 is loaded into the actual storage system 114, then the policy manager 128 performs (at 154) first actions to maintain synchronization between the loaded physical storage device 124 and the corresponding virtual storage device 122. The first actions include checking whether a matching virtual storage device is present. If the matching virtual storage device is present, then the policy manager 128 sets the matching virtual storage device to a writable state or performs another action (described in detail in connection with FIG. 3) to achieve synchronization between the virtual storage device and physical storage device. However, if the policy manager 128 determines that the matching virtual storage device is not present, then the policy manager 128 creates a new virtual storage device that corresponds to the loaded physical storage device and performs an appropriate action.

If the status change is an eject, then the policy manager 128 performs (at 156) second actions to maintain synchronization. The eject status change can be an eject of a physical storage device or an eject of a virtual storage device. If the eject is of a physical storage device 124 from the actual storage system 114, then the second actions performed by the policy manager 128 include moving the corresponding virtual storage device to a predefined location 125 in the virtual library system 116, where this predefined location 125 corresponds to a location containing virtual storage devices associated with physical storage devices that have been ejected. This predefined location is also referred to as a "Firesafe" location. Note the term "Firesafe" is an arbitrary term that can be changed in other implementations. The Firesafe location 125 is depicted as being part of the storage subsystem 118. In other implementations, the Firesafe location 125 can be located in another storage medium in the virtual library subsystem 116.

The policy manager 128 can set indications in virtual storage devices (associated with ejected physical storage devices) in the Firesafe location 125 to set the virtual storage devices to read-only status and to allow the virtual storage devices to be deleted if desired. Additionally, the second actions include generating error notifications in cases where a copy job from the corresponding virtual storage device to the ejected physical storage device is still pending or occurring.

If the eject status change is an eject of a virtual storage device 122, then the second actions performed by the policy manager 128 at 156 include checking whether there are pending copy jobs for the virtual storage device 122 to be ejected, and if so, waiting for the copy jobs to complete prior to causing the corresponding physical storage device to be ejected.

In some cases, ejection of a physical storage device can cause a pending copy job to not be able to complete. In this case, in accordance with some embodiments, the policy manager 128 generates an error notification so that a user (e.g., system administrator or other user) is made aware that the ejected physical storage device contains bad data (in other words, the data on the ejected physical storage device has not been properly synchronized with the data on the virtual storage device). The automatic error handling reduces the likelihood that a user will take a physical storage device containing bad data (partially synchronized data or even blank data) offsite with the mistaken belief that the physical storage device has been properly synchronized. Also, such error handling reduces the likelihood that a user will attempt to restore from a physical storage device containing bad data.

As noted above, the virtual storage device associated with an ejected physical storage device is moved to the Firesafe location 125. The ejected physical storage device may then be moved offsite. A benefit offered by moving the virtual storage device to the Firesafe location 125 (rather than immediately deleting the virtual storage device upon ejection of the corresponding physical storage device) is that a user can actually restore from the virtual storage device associated with the ejected physical storage device by first moving the virtual storage device out of the Firesafe location, restoring from the virtual storage device, and then moving the virtual storage device back to the Firesafe location. In accordance with some embodiments, to avoid the virtual library system 116 running out of storage space, an expiry policy is provided to delete virtual storage devices in the Firesafe location 125 after predefined periods of time.

As further depicted in FIG. 1, the virtual library system 116 includes a data movement agent 132 (which can be implemented as software) for performing data and control access to the actual storage system 114. In response to requests from the automigration engine 126 or a backup application (106, 108), the data movement agent 132 sets up a data transfer between the virtual library system 116 and the actual storage system 114 (such as by reserving a drive, e.g., a tape drive, in the actual storage system) so that a data copy can be performed from a specified virtual storage device 122 to a corresponding physical storage device 124. The copying performed by the data movement agent 132 ensures that the exact format (e.g., tape format) on the virtual storage device 122 is duplicated on the physical storage device 124. Examples of tape format include filemarks, setmarks, tape block size, and so forth. The automigration of data from the virtual library system 116 to the actual storage system 114 can copy an entire virtual storage device 122 to the corresponding physical storage device 124, or copy a specified portion of a virtual storage device 122 to the corresponding physical storage device 124.

The data movement agent 132 also controls the transfer of data in the opposite direction from the actual storage system to the virtual library system 116 (referred to as a reverse copy operation). In this case, the data movement agent 132 ensures that the exact format (e.g., tape format) on the physical storage device is duplicated on the virtual storage device.

The automigration engine 126 automatically copies, asynchronously, data from the virtual storage devices 122 to the physical storage devices 124 of the actual storage system 114, so that the view of the backup applications 106, 108 of the virtual storage devices 122 matches the physical storage devices in the actual storage system 114. Thus, when a user identifies a particular physical storage device in the backup application, such as for offsite storage or for the purpose of performing a restore, the user would see that the identifier (such as a bar code) of the physical storage device in the actual storage system 114 matches a media database of the backup application (which media database is based on the content of the virtual library system 116).

A physical library monitor 134 (which can be implemented as software) in the virtual library system 116 monitors the actual storage system 114 for media status changes (such as loading or ejecting of physical storage devices 124 in the actual storage system 114). In one implementation, the physical library monitor 134 continually polls (such as repeatedly at some predetermined time interval) to check for status changes in the actual storage system 114, including (1) opening of a library door (not shown) of the actual storage system 114 to allow manual loading or ejection of physical storage devices, and (2) moving physical storage devices between partitions of the actual storage system 114 using a front display panel (not shown) of the actual storage system 114. The front display panel refers to a graphical user interface (GUI) screen displayed by the actual storage system 114 to allow a user to select control items in the GUI screen to move physical storage devices within the actual storage system 114.

In response to either of these events, a full scan of the physical storage devices in the actual storage system 114 (such as a full bar code scan) can be performed to generate an inventory of all the physical storage devices in the actual storage system 114. Any asynchronous bar code scan initiated by a backup application (106, 108) will report the contents of the slots of the virtual library system 116 (which may be different from the actual storage system 114). However, the asynchronous bar code scan also triggers the virtual library system 116 to perform a bar code scan of the actual library system 114 to update the slot inventory in the virtual library system 116.

The virtual library system 116 also includes a virtual library monitor 135 for monitoring ejection of a virtual storage device that is either activated by a backup application (106, 108) or by a virtual library GUI screen 136A displayed in a display device 138 associated with the virtual library system 116. Note that various GUI screens (including 136A and 136B as depicted in FIG. 1) can be displayed by the display device 138, with each GUI screen activated by a tab or other menu item displayed by the display device 128. The GUI screen 136B is associated with the automigration engine 126 in the virtual library system 116, and is described further below.

The virtual library system 116 also includes a jobs queue 140, which stores various pending jobs that are to be performed between the virtual library system 116 and the actual storage system 114. In FIG. 1, the jobs queue 140 is depicted as being contained in the storage subsystem 118. However, the jobs queue 140 can be stored on another storage medium in the virtual library system 116. Jobs that can be added to the jobs queue 140 include copy jobs (to copy data from a virtual storage device to a physical storage device), reverse copy jobs (performed during a restore operation to copy data from a physical storage device to a virtual storage device), and scan jobs (to scan header information of physical storage devices). Header information of a storage device (such as a tape or disk) contains various metadata regarding the storage device, such as the media type, media size, and identifier information (e.g., bar code). The jobs in the jobs queue 140 are processed by a jobs manager 133 (which can be implemented as software). Each job in the queue 140 has attributes that define the job type (scan, copy to physical storage device, reverse copy), the target physical storage device and the corresponding virtual storage device, and the target physical library.

The virtual library monitor 135 (which can be implemented as software) generates copy jobs when the virtual library monitor detects a virtual storage device has been modified compared to the last time the virtual storage device was copied to a physical storage device. The virtual library monitor will also trigger a copy job restart if the virtual library monitor detects a virtual storage device has been modified while it is being actively copied.

Figure 3:
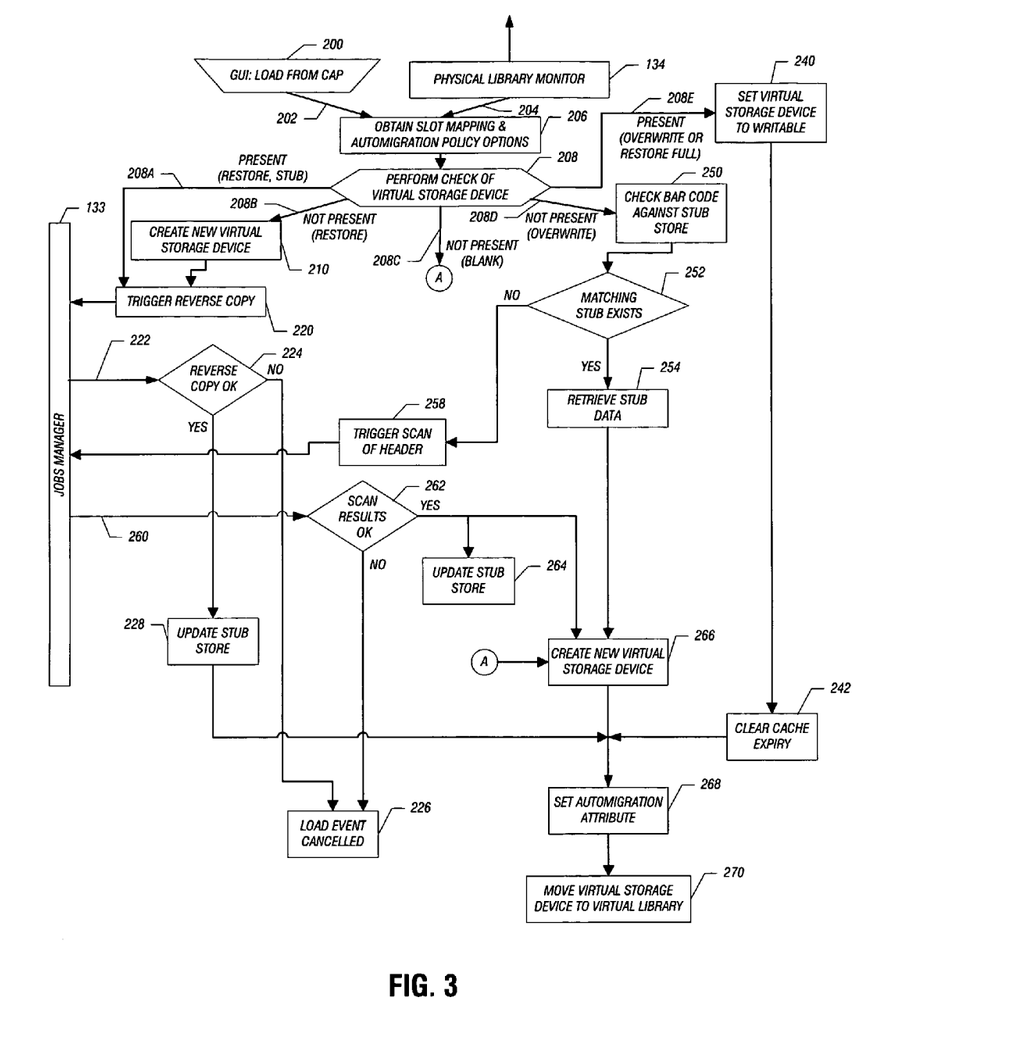
FIG. 3 is a flow diagram of a process performed in response to loading of a storage device, in accordance with an embodiment.

FIG. 3 illustrates a flow diagram of a process performed by the virtual library system 116 in response to a load event. A load event refers to loading of a physical storage device 124 into the actual storage system 114, where such loading includes the following examples: (1) loading using the front display panel of the actual storage system 114, (2) loading through the front door of the actual storage system 114, and (3) manually moving a physical storage device from a mapped or unmapped slot to a mapped slot using the automigration GUI screen 136B. The terms "unmapped slot" and "mapped slot" refer to physical slots (for receiving physical storage devices 124) in the actual storage system 114. A physical slot is considered to be mapped if the physical slot is mapped to a particular virtual library in the virtual library system 116. An unmapped slot refers to a slot that has not been mapped to a virtual library system 116. Physical storage devices can be moved between slots, such as between two mapped slots or between a mapped slot and an unmapped slot. In the virtual library system, virtual slots are also defined, where such virtual slots can receive corresponding virtual storage devices 122.

In some embodiments, all the above loading events are detectable by the physical library monitor 134 in the virtual library system 116. Another load event includes loading using the cartridge access port (CAP) of the actual storage system 114, as controlled by a user with the automigration GUI screen 136A. The cartridge access port is also sometimes referred to as a mail slot or load input/output slot, through which a user can load or eject physical storage devices based on selections made in the automigration GUI screen 136A. The various load events identified above are provided for purposes of example—in other example implementations, other types of load events may be used.

In one example implementation, three types of load events are possible: load for overwrite (in which a physical storage device is loaded into the actual storage system 114 for the purpose of overwriting the data content of the physical storage device), load blank for overwrite (in which a blank physical storage device is loaded for the purpose of writing data to the blank physical storage device), and load for restore (in which a physical storage device is loaded for the purpose of restoring data from the loaded physical storage device into the virtual library system 116).

As depicted in FIG. 2, using the GUI screen 136A, a load through the cartridge access port (CAP) can be specified (at 200), where the specified load can be a load for overwrite, a load blank for overwrite, or a load for restore. The load using the cartridge access port is indicated by an indication 202, where the indication 202 also specifies the type of load (load for overwrite, load blank for overwrite, or load for restore). A manual load can also be detected by the physical library monitor 134, which provides an indication (204) of the manual load. The indication also specifies the type of load.

In response to detection of a load event, the policy manager 128 obtains (at 206) the following information: current automigration slot mapping for the physical slot that received the newly loaded physical storage device, and automigration policy options. The slot mapping refers to the mapping of the physical slot to a virtual library (note that there may be multiple virtual libraries in the virtual library system 116). An example of an automigration policy option is the storage device sizing factor, which defines the maximum size of the virtual storage device relative to the corresponding physical storage device. The storage device sizing factor is used to ensure that the virtual storage device size is smaller than the corresponding physical storage device so that data in the virtual storage device can fit into the corresponding physical storage device.

Next, the policy manager 128 checks (at 208) to determine whether there is a matching virtual storage device already existing in the virtual library system 116. As explained further below, a virtual storage device 122 is maintained in the virtual library system 116 for some retention period (referred to as a cache retention period) after ejection of the corresponding physical storage device from the actual storage system 114. Thus, it is possible that a physical storage device that has been previously ejected and then re-loaded into the actual storage system 114 may still have a corresponding virtual storage device 122 present in the virtual library system 116. If the load operation is a load for restore, the policy manager 128 also checks (at 208) to determine whether the virtual storage device is a full virtual storage device (virtual storage device contains both a valid header and data) or whether the virtual storage device is a stub that contains a valid header but no actual content.

In the restore context, if the matching virtual storage device does not exist, then the policy manager 128 follows control path 208B and creates (at 210) a new virtual storage device with matching bar code, size, and type (corresponding to the loaded physical storage device). The policy manager 128 then triggers (at 220) a reverse copy from the loaded physical storage device into the virtual storage device. The trigger is provided to the jobs manager 133 in the virtual library system 116, which jobs manager 133 schedules the reverse copy job in the jobs queue 140.

On the other hand, in the restore context, if the matching virtual storage device is determined (at 208) to exist, but the existing virtual storage device is a stub (containing a valid header but no data content), then the policy manager 128 follows control path 208A to trigger (at 220) a reverse copy job, while skipping the create task 210 (since a stub virtual storage device is already present, a new virtual storage device does not have to be created).

When the reverse copy job is completed, the jobs manager 133 provides a job results indication (at 222) back to the policy manager 128, which determines (at 224) if the reverse copy results are OK (in other words, the reverse copy completed successfully).

If the reverse copy job failed (such as due to a media read error) or was cancelled (such as due to the physical storage device being ejected before the reverse copy job could start), then the load event is cancelled (at 226). However, if the job finished successfully, then the header (e.g., tape header) of the virtual storage device can be copied (at 228) to a stub store 129 (FIG. 1). The stub store 129 contains a database (collection) of headers and sizes for previously automigrated physical storage devices. In FIG. 1, the stub store 129 is depicted as being part of the storage subsystem 118—however, in other implementations, the stub store 129 can be located on other storage media.

In the load for restore context, if there is a matching full virtual storage device (as determined at 208), then the policy manager 128 follows control path 208E, where the policy manager 128 sets (at 240) the virtual storage device to read-write mode, since the virtual storage device may have been previously set to read-only mode (when the corresponding physical storage device was ejected). Note that the policy manager 128 also follows control path 208E in response to determining that a virtual storage device is present for a load for overwrite operation.

After setting the virtual storage device to read-write mode, the cache expiry time in an expiry date store 131 (FIG. 1) is cleared (at 242). The cache expiry store 131 (depicted as being in the storage subsystem 18 in FIG. 1 but which could be stored elsewhere in an alternative implementation) stores expiration times (dates and times) for corresponding virtual storage devices that have been moved to the Firesafe location 125 (FIG. 1) due to ejection of the corresponding physical storage devices. Each "ejected" virtual storage devices in the Firesafe location 125 is maintained for some predefined period of time until the indicated cache expiry time.

If the load event is a load for overwrite and the corresponding virtual storage device is not present, then the policy manager 128 will follow one of two control flows 208C and 208D from task 208 depending on whether the requested operation is load blank for overwrite or just load for overwrite. In the latter case, the policy manager 128 checks the stub store 129 (at 250) to determine whether the bar code of the newly loaded physical storage device corresponds to a stub that is contained in the stub store 129.

If a matching virtual storage device stub exists in the stub store 129, as determined at 252, then the stub data is retrieved (at 254) from the stub store 129. The retrieved stub data is used to create (at 266) the new virtual storage device containing a header (e.g., tape header written by the backup application) from the physical storage device, with the same bar code and the same basic type as the physical storage device and the correct size for the type of the loaded physical storage device. This provides the benefit that when a previous automigrating physical storage device is re-loaded into the library for overwrite, a scan of the loaded physical storage device (such as a tape scan) does not have to be performed to retrieve the header information from the physical storage device.

However, if the policy manager 128 determines (at 252) that the bar code is a new bar code (in other words, the stub store 129 does not contain header information for the bar code), then the policy manager triggers (at 258) a scan of the header of the physical storage device. The trigger of the scan of the header is sent to the jobs manager 133. Upon completion of the header scan, job results (260) are returned, and the policy manager 128 determines (at 262) whether the scan results returned are OK (the scan job completed successfully). If not, then the load event is cancelled (at 226). However, if the scan results returned are OK, then the policy manager 128 updates (at 264) the new header information into the stub store 129. Also, the retrieved header is used to create (at 266) a new virtual storage device having a matching bar code, size, and type.

The above described the control flow for a load for overwrite (following control path 208D). If the load is a load blank for overwrite, then the tasks performed at 250, 252, 254, 258, 260, 262, and 264 are skipped, with the policy manager 128 following control path 208C to proceed directly from task 208 to task 266 to create the new virtual storage device with matching bar code, size, and type as the loaded blank physical storage device.

For the created or existing virtual storage device, the automigration attribute on the virtual storage device is set (at 268) and the virtual storage device is moved (at 270) to the appropriate virtual library mapped to the physical slot that received the newly loaded physical storage device. The set automigration attribute will cause automigration rules to be enforced so that a user cannot manually delete the virtual storage device.

Figure 4:
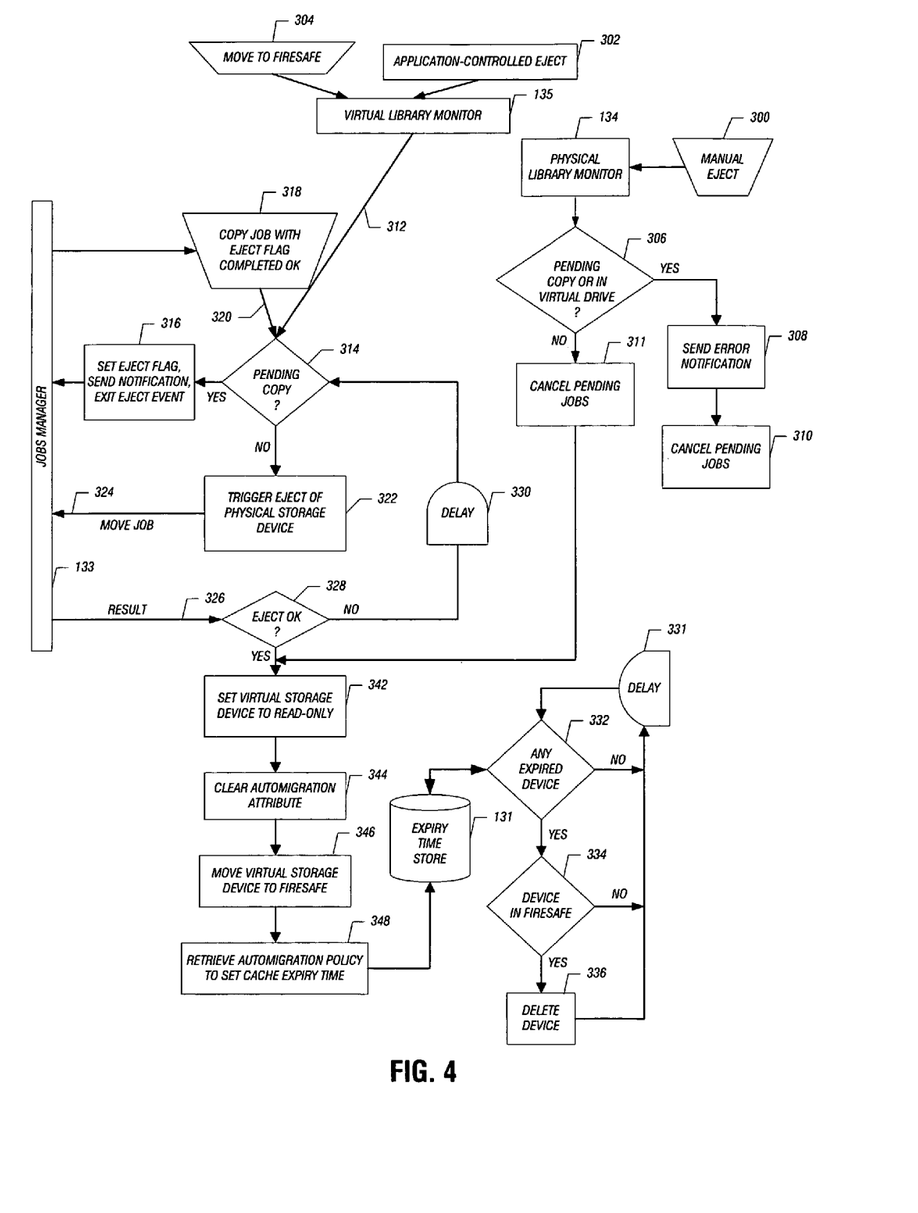
FIG. 4 is a process performed in response to ejecting of a storage device, in accordance with an embodiment.

FIG. 4 shows a process performed by the policy manager 128 in response to a manual eject of a physical storage device from the actual storage system 114, or in response to an eject of a virtual storage device specified by a backup application or the virtual library GUI screen 136A.

A manual eject (300) of a physical storage device includes (1) manually ejecting a physical storage device from the actual storage system 114 using the library front display panel, (2) opening the door to manually eject, or (3) manually moving a physical storage device from a mapped slot to an unmapped slot in the actual storage system 114. A manual eject event is detected by the physical library monitor 134.

The virtual library monitor 135 detects either an application-controlled eject event (302) of a virtual storage device, such as under control of a backup application to eject a virtual storage device from a virtual library cartridge access port, or a manual eject (304) in which a virtual storage device is moved to the Firesafe location 125, as specified by a user in the virtual library GUI screen 136A.

In response to a manual eject (300) of a physical storage device, as detected by the physical library monitor 134, the policy manager 128 checks (at 306) whether the ejected physical storage device is fully synchronized (in other words, there is not a pending copy job to copy data from a virtual storage device to the ejected physical storage device). The policy manager 128 also checks whether the corresponding virtual storage device is not active (in other words, not in a virtual drive). A virtual storage device being in a virtual drive indicates that there is a possibility that copying of data from the virtual storage device to the ejected physical storage device was still proceeding. A virtual drive emulates a physical drive (such as a tape drive) in the actual storage system 114. If there is a pending copy job for the ejected physical storage device or if the virtual storage device was loaded in a virtual drive, then an error notification is generated (at 308) to indicate that the ejected physical storage device is in a bad state because the ejected physical storage device is out of synchronization with the virtual storage device. Such error handling ensures that the user is aware that a particular physical storage device contains bad data so that the user knows not to send the particular physical storage device offsite for storage or to restore data from the particular physical storage device.

All pending jobs (in the jobs queue 140) for the bar code of the ejected physical storage device are then cancelled (at 310). Cancelled jobs include copy jobs, reverse copy jobs, or header scan jobs.

However, if the policy manager 128 determines (at 306) that the ejected physical storage device has no pending copy jobs and is not loaded in a virtual drive, then no error notification is generated, but all pending jobs in the jobs queue 140 for the bar code of the ejected physical storage device are cancelled (at 311). In addition, the flow continues to modify the virtual storage device (associated with the ejected physical storage device) to reflect the eject event (tasks 342-348 described further below).

If the virtual library monitor 135 detects an application-controlled eject or a manual move of a virtual storage device to the Firesafe location 125 using the GUI screen 136A, the virtual library monitor 135 issues an indication 312. In response to the indication 312, the policy manager 128 checks (at 314) if the ejected virtual storage device is in the fully synchronized state (no copy jobs from the ejected virtual storage device are pending). If there is a pending copy job for the virtual storage device, then the copy job has the eject attribute set (at 316) and a notification is sent to the requesting user (such as by e-mail) indicating that the requested eject was deferred. The eject event then exits. Setting of the eject flag is communicated to the jobs manager 133. When the copy job with the eject flag set completes successfully (318), a copy job eject event (320) is issued to ensure that a deferred eject will be completed.

If the ejected virtual storage device has no pending copy jobs (determined at 314), then the policy manager 128 triggers (at 322) an eject of the corresponding physical storage device into a physical library cartridge access port (or to another output port). In response, the policy manager 128 sends (at 324) a move job request to the jobs manager 133 (to eject the physical storage device to a cartridge access port). Move job results are returned (at 326) so that the policy manager 128 can determine (at 328) whether the eject of the physical storage device completed successfully. The move job results (326) can indicate that the move was unsuccessful (such as due to the cartridge access port being full). In this case, a delay is set (at 330) and the policy manager 128 returns to task 314 to check for any pending copy jobs, since a backup to the virtual storage device (performed by a backup application) may have completed since the eject event started (and thus a new copy job may have been scheduled).

If the physical eject to the cartridge access port succeeds, as determined at 328, then the automigrating virtual storage device can be modified to reflect the eject of the physical storage device (tasks 342-348).

The virtual storage device associated with the ejected physical storage device is set (at 342) to read-only mode, so that if the virtual storage device is manually moved to a virtual library slot, a backup application will not be able to use it for new backups (the backup application will not be able to write to the read-only virtual storage device). Also, the automigration attribute on the virtual storage device is cleared (at 344) (so the user can delete the virtual storage device if desired). The virtual storage device is then moved (at 346) from the virtual library slot to the Firesafe location 125.

Next, the policy manager 128 retrieves (at 348) the automigration policy for the particular virtual library to set a cache expiry time for the virtual storage device. The cache expiry time for the virtual storage device is stored in the expiry date store 131.

Periodically, after some predetermined delay (331), the policy manager 128 checks (at 332) to see if any virtual storage devices have expired. If so, the policy manager 128 determines (at 334) whether the expired virtual storage device is in the Firesafe location 125. If so, the expired virtual storage device is deleted (at 336). If there are no expired virtual storage devices, or if the expired virtual storage device is not in the Firesafe location 125, then deletion of the virtual storage device is not performed. The deletion of expired virtual storage devices from the Firesafe location 125 ensures that storage space does not run out in the virtual library system 116.

The policy manager 128 also performs management in response to various configuration changes, such as physical-to-virtual slot mapping changes, deletion of virtual libraries, movement of virtual storage devices, and deletion of physical libraries. If a user deletes a virtual library that has physical library slots mapped to it, then any active/pending jobs for the physical storage device in the physical library will be cancelled, and any automigrating virtual storage devices in the deleted virtual library will be set to read-only, and moved to the Firesafe location 125 with their automigration attribute cleared so that they can be deleted if desired.

If a user deletes a physical library from the configuration of the virtual library system 116, then all automigrating virtual storage devices that were associated to any slots in the deleted physical library will be set to read-only and moved to the Firesafe location 125 with their automigration attribute cleared, and any active/pending jobs for that physical library will be cancelled.

If a physical-to-virtual slot mapping is moved to a new virtual library (the mapping of a physical slot to a virtual library is changed to a different virtual library), then any matching virtual storage device with a physical storage device in that slot is also moved to the new virtual library. If a physical-to-virtual slot mapping is deleted, then the matching virtual storage device is set to read-only and moved to the Firesafe location 125 with its automigration attribute removed, and any active/pending jobs for the physical storage device in that slot will be cancelled.

If an automigrating virtual storage device is manually moved to another virtual library, then this will effectively act as modifying the physical-to-virtual slot mapping policy for the slot containing the matching physical storage device to point to the new virtual library destination. If an automigrating virtual storage device is manually moved to the Firesafe location 125, then this will be treated as being manually ejected from the virtual library to trigger an eject event as discussed above.

Instructions of software described above (including the software modules in the virtual library system 116 and backup servers 100, 102 of FIG. 1) are loaded for execution on a processor (such as one or more CPUs). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A virtual storage system comprising:
 a storage subsystem having virtual storage devices to emulate physical storage devices of an actual storage system; and
 a controller to:
  detect a status change of a particular physical storage device in the actual storage system, the status change comprising at least one of loading of the particular physical storage device and ejecting of the particular physical storage device; and
  in response to detecting the status change of the particular physical storage device, perform synchronization between the virtual storage system and the actual storage system by updating a state of a corresponding virtual storage device in the virtual storage system,
  wherein the controller is configured to update the state of the corresponding virtual storage device by:
   in response to the particular physical storage device being loaded in the actual storage system, checking whether the corresponding virtual storage device exists in the virtual storage system; and
   in response to determining that the corresponding virtual storage device does not exist in the virtual storage system, creating the corresponding virtual storage device.

2. The virtual storage system of claim 1, wherein the controller is configured to update the state of the corresponding virtual storage device by further:
 setting the corresponding virtual storage device to a writable state from a read-only state in response to determining that the corresponding virtual storage device exists.

3. The virtual storage system of claim 1, wherein the controller is configured to create the corresponding virtual storage device by:
   accessing a collection of header information to determine whether header information for the loaded physical storage device is present;
   in response to the header information for the loaded storage device being present in the collection, adding the header information for the loaded physical storage device to the corresponding virtual storage device; and
   in response to the header information for the loaded storage device not being present in the collection, triggering a scan of a header of the loaded physical storage device to copy information from the header to the corresponding virtual storage device.

4. The virtual storage system of claim 1, wherein loading of the physical storage device is performed for one of an overwrite operation and a restore operation, and wherein the controller is configured to trigger a reverse copy operation to copy data from the loaded physical storage device to the corresponding virtual storage device in response to detecting that the loading is performed for the restore operation.

5. The virtual storage system of claim 1, wherein the created corresponding virtual storage device has metadata identical to metadata of the loaded physical storage device.

6. The virtual storage system of claim 5, wherein the metadata includes an identifier of the loaded physical storage device, a type of the physical storage device, and a size of the physical storage device.

7. The virtual storage system of claim 1, wherein the controller is configured to monitor the actual storage system to detect ejection of the particular physical storage device from the actual storage system, and to update the state of the corresponding virtual storage device by moving the virtual storage device to a predefined location in response to detecting ejection of the particular physical storage device from the actual storage system.

8. The virtual storage system of claim 1, wherein, in response to detecting ejection of the particular physical storage device from the actual storage system, the controller is configured to:
   check whether a copy job is pending for the ejected physical storage device; and
   if a copy job is pending for the ejected physical storage device, set an error condition.

9. The virtual storage system of claim 1, wherein the controller is configured to update the state of the corresponding virtual storage device in response to detecting ejection of the particular physical storage device from the actual storage system by setting the virtual storage device to a read-only state.

10. The virtual storage system of claim 1, wherein the controller is configured to update the state of the corresponding virtual storage device in response to detecting ejection of the particular physical storage device from the actual storage system by setting an expiry time for the corresponding virtual storage device.

11. The virtual storage system of claim 10, wherein the controller is configured to check for expiration of the expiry time, and in response to expiration of the expiry time, the controller is configured to delete the corresponding virtual storage device.

12. The virtual storage system of claim 1, wherein, in response to detecting ejection of the particular physical storage device from the actual storage system, the controller is configured to:
   check whether the corresponding virtual storage device is in a virtual drive; and
   if the corresponding virtual storage device is in the virtual drive, set an error condition.

13. The virtual storage system of claim 1, wherein the controller is configured to further:
   detect a data state change in one or more virtual storage devices in the virtual storage system; and
   copy content of the one or more virtual storage devices to respective one or more physical storage devices in the actual storage system in response to the data state change.

14. A method for use with a virtual storage system having virtual storage devices for emulating physical storage devices of an actual storage system, comprising:
   detecting loading of a physical storage device in the actual storage system;
   in response to detecting loading of the physical storage device, perform synchronization between the virtual storage system and the actual storage system by checking whether a corresponding virtual storage device exists in the virtual storage system, and in response to determining that the corresponding virtual storage device does not exist in the virtual storage system, creating the corresponding virtual storage device.

15. The method of claim 14, further comprising:
   in response to detecting data change on a particular virtual storage device in the virtual storage system, performing automigration to copy data from the particular virtual storage device to a corresponding physical storage device in the actual storage system.

16. The method of claim 15, wherein performing the automigration is performed transparently to a backup application executable on a backup server that is separate from the virtual storage system.

17. The method of claim 14, further comprising:
   in response to detecting one of loading of a particular physical storage device and ejection of the particular physical storage device, performing at least one of:
      maintaining consistency of data between the particular physical storage device and a particular virtual storage device; and
      generating an error condition to indicate that the particular physical storage device is not synchronized with respect to the particular virtual storage device.

18. The method of claim 14, further comprising:
   monitoring the actual storage system to detect ejection of a particular physical storage device from the actual storage system; and
   in response to detecting the ejection of the particular physical storage device, moving a corresponding virtual storage device in the virtual storage system to a predefined location of the virtual storage system.

19. An article comprising at least one storage medium containing instructions that when executed cause a virtual library system to:
   monitor an actual storage system having physical storage devices to detect ejection of a particular one of the physical storage devices;
   in response to detecting ejection of the particular physical storage device, perform an action with respect to a virtual storage device in the virtual library system that corresponds to the particular physical storage device to maintain synchronization between the virtual storage device and the particular physical storage device;
   detect loading of a second physical storage device into the actual storage system;

in response to detecting loading of the second physical storage device, check whether a corresponding second virtual storage device exists in the virtual storage system; and in response to determining that the corresponding second virtual storage device does not exist in the virtual storage system, create the corresponding second virtual storage device.

\* \* \* \* \*